Dec. 22, 1970 M. J. LUCKEY Re. 27,008

BREATH ALCOHOL DETERMINATION

Original Filed June 8, 1966 2 Sheets-Sheet 1

INVENTOR.
MANLEY J. LUCKEY
BY
Christie, Parker & Hale
ATTORNEYS.

BREATH ALCOHOL DETERMINATION

Original Filed June 8, 1966 2 Sheets-Sheet 2

INVENTOR.
MANLEY J. LUCKEY

BY Christie, Parker & Hale
ATTORNEYS

United States Patent Office

Re. 27,008
Reissued Dec. 22, 1970

27,008

BREATH ALCOHOL DETERMINATION

Manley J. Luckey, 2866 Muscupiave Drive,
San Bernardino, Calif. 92405

Original No. 3,437,449, dated Apr. 8, 1969, Ser. No. 556,053, June 8, 1966. Application for reissue Sept. 29, 1969, Ser. No. 877,909
Int. Cl. G01n *33/16*
U.S. Cl. 23—254 13 Claims

Matter enclosed in heavy brackets [ ] appears in the original patent but forms no part of this reissue specification; matter printed in italics indicates the additions made by reissue.

*ABSTRACT OF THE DISCLOSURE*

*This invention relates to the determination of blood alcohol content by analysis of breath. Apparatus and a method of using it are provided wherein an elastic container is inflated to a selected size by a person's breath. The breath from the elastic container is then passed through a tube into an inflatable container having a predetermined volume. The tube contains a reagent providing a selected resistance to fluid flow and having a color change reaction in response to alcohol vapor for measuring the alcohol content of the breath. In the alternative, an alcohol trap in the tube can exaract alcohol for subsequent analysis. Means for connecting the tube to the containers are also provided.*

This invention relates to the determination of blood alcohol content by analysis of breath. More particularly, the invention relates to improved method and apparatus for measuring the content of alcohol vapor in human breath.

It is now well established that alcoholic intoxication is directly related to blood alcohol content and that the degree of a person's intoxication can be determined by the extent to which alcohol is present in the person's breath derived from the alveolae. The alveolae are the small bulbs in the lung wherein oxidation of blood impurities takes place. This invention provides for the determination of a person's blood alcohol content by accurately determining the amount of alcohol vapor present in a known sample of alveolar breadth. A determination so made does not depend upon the taking of a blood sample nor does it require a prolonged detention of the person. The use of the invention, therefore, is not subject to the objection of unlawful detention or search.

There is present in 2100 cc. of alveolar breath of the average person the same weight of alcohol vapor as there is in 1 milliliter of that person's blood. This relation is used in the present invention to produce a simple, effective, economic and accurate procedure and apparatus for rapidly and easily determining the weight percentage of alcohol in the blood of a person.

Generally speaking, this invention provides breath alcohol measurement apparatus comprising first, second and third containers. The first container is inflatable and elastic and has an inlet. The first container is adapted to be inflated with a person's breath by the person blowing into the inlet until the container has a selected size, at which point the container exerts a selected pressure on breath present therein. The second container has an elongate hollow configuration with opposite open ends. A quantity of alcohol sensitive reagent is housed within the second container along at least a portion of the length of the container. The reagent has the property that it responds to alcohol vapor to change color progressively in an amount proportional to the amount of alcohol vapor present in gas passed through the second container. The third container is inflatable but inelastic and has a selected internal volume when inflated. The apparatus also includes means mounting the reagent in the second container to define a selected impedance to gas flowing through the second container. Further the apparatus includes means for coupling the second container between the first and third containers so that breath flows from the inflated first container to the third container until the third container is filled.

The above-mentioned and other features of the invention are more fully set forth in the following detailed description of the invention, which description is presented with reference to the accompanying drawing, wherein.

Figure 1:
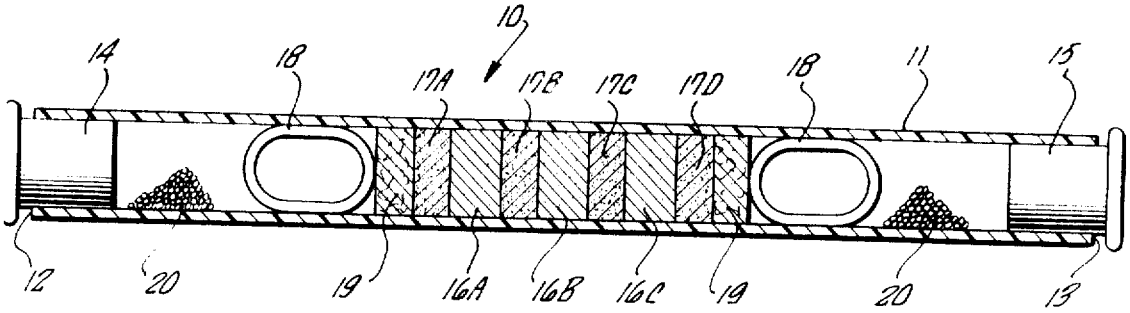
FIG. 1 is a side elevation view of an indicator tube useful with and forming a part of various breath analyser devices according to this invention.

Breath analyser devices in accord with this invention incorporate an indicator tube 10 of the type described in my U.S. Patent 3,223,488, issued Dec. 14, 1965. The tube, as shown in FIG. 1, includes a length of transparent glass tubing 11 having opposite open ends 12 and 13. End 12 is flame treated so that no rough edges are present around the opening into the tube. End 13, however, is not flame treated and has rough or sharp edges around the corresponding opening into the tube. During the period between manufacture and use of the tube, the ends of the tube are sealed by removable plugs 14 and 15 preferably made of molded polyethylene or polypropylene. Plub 14, disposed in end 12, preferably is white in color, and plug 15, disposed in end 13, has a charatceristic color to identify the end of the tube which has a rough-edged opening.

A quantity of alcohol sensitive reagent 16 is disposed in the tube, the reagent being carried upon discrete quantities 16A, 16B and 16C of a granular material which has been impregnated with the liquid reagent. Preferably the carrier for the reagent is granular silica gel. The impregnation of the carrier granules with the reagent results in the reagent being present in the tube in a substantially, though not completely dry state. The reagent impregnated quantities 16A, 16B and 16C lie between bodies 17A, 17B, 17C and 17D of inert granules such as colorless glass grit. The reagent has a characteristic color and has the charatceristic that it changes color progressively along the length of tube 10 in direct proportion to the amount of alcohol vapor passed through the tube, the color change being produced by a chemical reaction of the reagent with such alcohol vapor. The reagent is a mixture of a chromate-ion producing substance and sulfuric acid. Suitable chromate-ion producing substances are sodium dichromate, ammonium dichromate and chromic acid; sodium dichromate is preferred. Such reagents normally have a pronounced orange color, and turn green when reacted with alcohol vapor.

The lengths of granular quantities 16A, 16B and 16C along the length of tube 10 correspond to selected quantities of alcohol in human blood. For example, each quantity may have a length such that when alcohol-laden breath is passed through the tube at a given rate for a given time, a complete change in color of one quantity will be an indication that the blood of the person from whom the breath sample was obtained has 0.15% alcohol (by weight) in his blood. It is preferred that quantities 16A, 16B and 16C be of equal length. Quantities 17A, 17B, 17C and 17D serve as marking elements within the tube to aid in evaluating the exact blood alcohol content of a given person whose breath is passed through the tube.

The granular contents of tube 10 are packed in the tube along a central portion of its length with a selected density so that the granules of glass grit and silica gel provide a selected resistance to gas flowing through the tube. The granules are held in the tube in such a state by a pair of polyethylene O-rings 18 compressed within the tube. Each O-ring engages a quantity of packing material 19, such as glass fiber or Acrilan fiber wadding, disposed against the opposite ends of quantities 17A and 17D.

A number of loose granules 20 of silica gel are disposed in each end of the tube to absorb sulfur dioxide given off from the reagent, thereby to stabilize and prevent degradation of the reagent.

Figure 2:
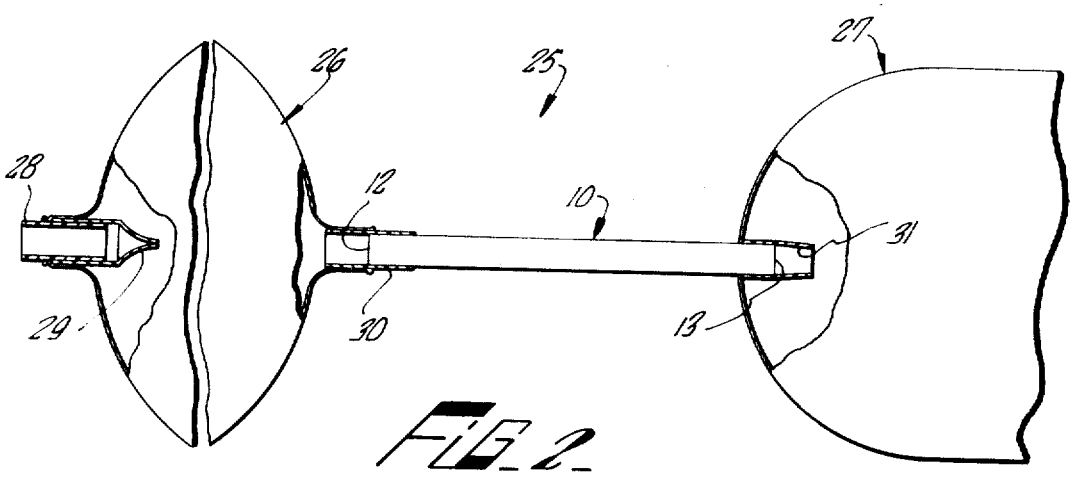
FIG. 2 is a side elevation view, partially in cross-section, of a breath analyser device.

Breath analysing apparatus 25, shown in FIG. 2, includes a tube 10, a balloon 26 and a volumetric control bag 27. The balloon is made of rubber so as to be collapsible and expansible. The balloon has an inlet mouthpiece tube 28 to which a flutter valve 29 is fitted within the balloon to check the passage of breath from the balloon outwardly through the mouthpiece tube. The balloon also has an outlet defined by a short length of soft plastic tubing 30, such as tubing made from vinyl plastic, having an inside diameter close to but slightly smaller than the outside diameter of tube 10. The balloon is selected so that when inflated to a predetermined size by a person blowing his breath into the mouthpiece tube, the balloon exerts on breath therein a pressure within a selected range of pressures. The selected range of pressures is chosen so that, in combination with the selected resistance to gas flow provided by the contents of tube 10, breath will flow from the balloon through the tube at a predetermined rate. It is desired that the balloon be such that substantial lung power must be used by a person inflating the balloon to cause the balloon to expand from its normal deflated state; this property of the balloon assures that the breath of a person using device 25 contains a maximum amount of alveolar breath as opposed to breath from the mouth, trachea [an dbronchial] *and bronchial* tubes.

Volumetric control bag 27 is inflatable but is inelastic, and is originally provided in its deflated state. Preferably, for the purposes of economy, the bag is made of polyethylene film. The bag, when fully inflated, encloses a predetermined volume.

Figure 3:
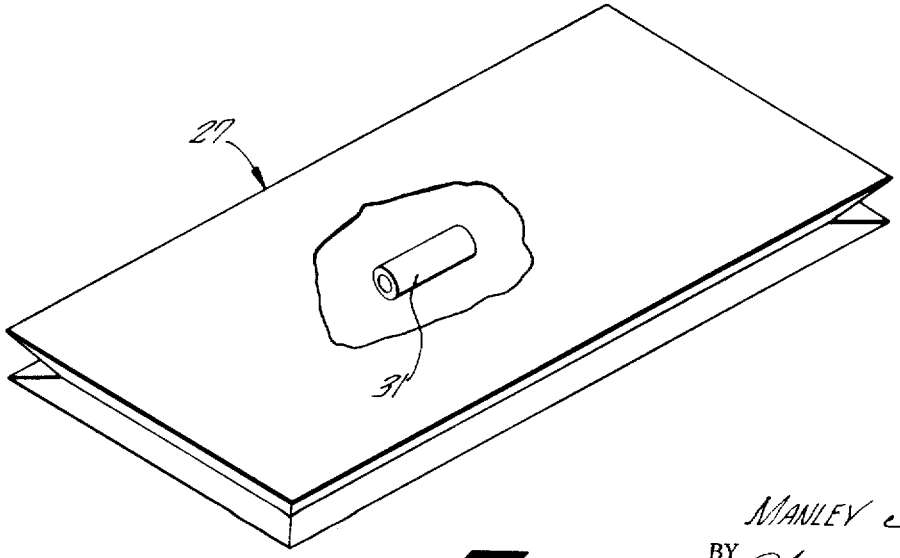
FIG. 3 is a perspective view, with parts broken away, of a volumetric control bag of the device shown in FIG. 2, the bag being shown in its collapsed state.

Device 25 is normally provided in a knock-down condition in which tube 10 is as shown in FIG. 1 with plugs 14 and 15 in place, in which balloon 26 is separate from the tube and is deflated, and in which bag 27 is completely sealed and contains a short length of soft plastic tubing 31 (see FIG. 3) substantially identical to tubing 30. In order to connect the volumetric control bag to tube 10 in assembling device 25, this invention uses a novel construction which provides an inlet to the bag.

At present there is no known solvent for polyethylene suitable for bonding polyethylene film to another plastic. As a result, the manufacture of a volumetric control bag having an inlet fitting can be a costly and time consuming process. This invention, however, provides a simple and low-cost connection of the bag to tube 10.

Figure 4:
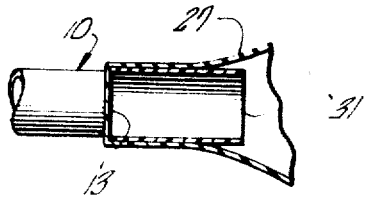
FIG. 4 is an enlarged cross-sectional elevation view of a step in the connection of the indicator tube shown in FIG. 1 to the bag shown in FIG. 3.
Figure 5:
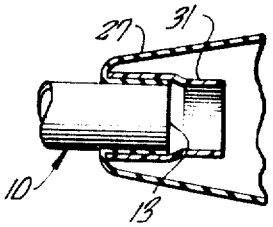
FIG. 5 is an enlarged cross-sectional elevation view depicting a subsequent step in the process shown in FIG. 4.

The bag is connected to tube 10 by removing plug 15 from end 13 of the tube and by discarding granules 20 from the tube. Tubing 31 within bag 27 is then manipulated within the bag, as shown in FIG. 4, so that the bag film material is stretched tight over one end of the tubing; this manipulation can be accomplished quite readily since the film from which the bag is made is essentially transparent. It will be recalled that tube end 13 is rough. This end of the tube is placed against the bag in essentially coaxial alignment with tubing 31 and the tube is forced axially of the tubing. As the tube is forced into the tubing, the tubing stretches to admit the tube, and film of bag 27 is also pushed into the tubing. Because the end of the tube is rough, the film is punctured during this process at some point following initial engagement of the tube within the tubing. As a result, the tube is placed into communication with the interior of the bag. Some of the bag film is pinched between the tubing and the tube circumferentially of the tube to provide an air-tight seal of the bag to the tube.

The assembly of the device is then completed by removing plug 14 from the other end of the tube, dumping granules 20 from the tube, and forcing tube end 12 into balloon outlet fitting 30.

The assembled device is then used to take a breath sample. This is done by first twisting or pinching the balloon adjacent its outlet *fitting* to seal off the outlet. The person whose breath sample is to be obtained then places the mouthpiece in his mouth and inflates the balloon until the balloon has expanded to the selected size. Because of the above-described characteristics of the balloon, the breath in the balloon will contain a mixture of alveolar and non-alveolar air. The relation of the alveolar air to the total mixture, for any size of balloon, can be known with accuracy. The outlet of the balloon is then opened and breath flows from the balloon at a selected rate for a period of time corresponding to the time required to fill the volumetric control bag. As a result, the extent of a progressive color change in the reagent within tube 10 will be an accurate indication of the weight percentage of alcohol in that person's blood.

Figure 9:
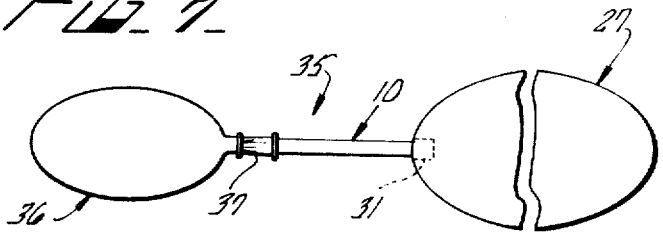
FIG. 9 is an elevation view of another breath analyser device.

Device 25 may be modified easily within the scope of this invention as shown in FIG. 9 to provide device 35 by using a simple toy balloon 36 or the like known to exert a given pressure on breath therein when inflated to a selected size. The balloon includes an inlet/outlet fitting 37 like fitting 30. The device is assembled by coupling the indicator tube to the volumetric bag as described above. The balloon is then inflated to the size desired and the inlet/outlet fitting is sealed off by pinching or twisting the balloon adjacent fitting 37 before removing the fitting from the person's mouth. The fitting then is engaged with end 12 of the indicator tube before unsealing the fitting. The remaining operation of such a modified device then follows in accord with the procedure described above.

Figure 6:
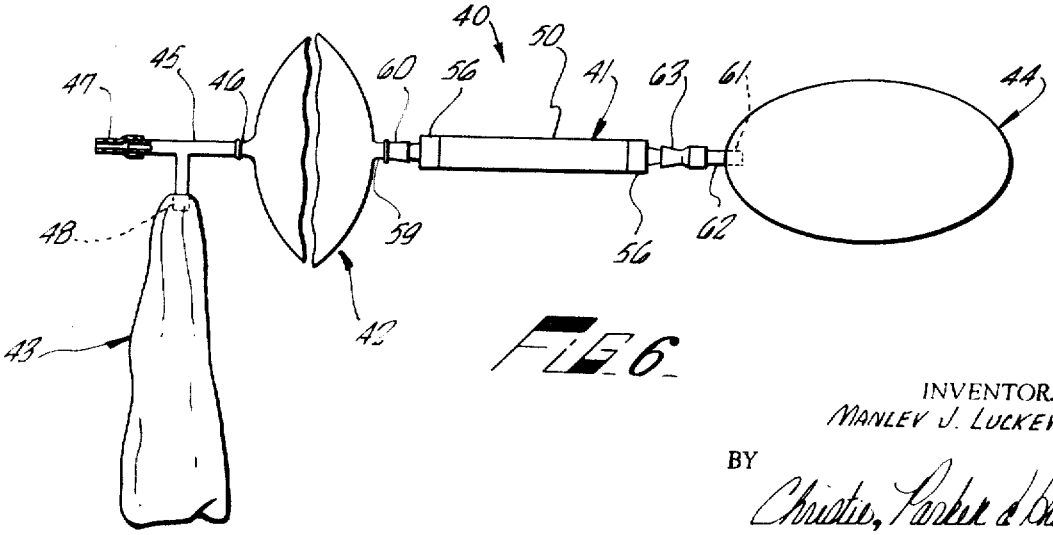
FIG. 6 is an elevation view, partially fragmented and partially in cross-section, of another breath analyser device according to this invention.

FIG. 6 shows another breath analysing device 40 which includes an alcohol trap 41, a balloon 42, a by-pass accumulator bag 43 and a volumetric control bag 44. Balloon 42 is similar to balloon 26 in that it exerts a pressure within a selected range of pressures upon breath therein when inflated to a selected expanded size. Volumetric control bag 44 is similar to bag 27 in that it is normally deflated, is not elastic and defines a selected volume therein when inflated.

The balloon has an inlet defined by a T-fitting 45, and by a nipple 46 or the like secured to one arm of the T-fitting. A check valve, similar to valve 29, is located in the balloon adjacent the T-fitting. A length of soft plastic tubing 47 is secured to another arm of the fitting and forms a mouthpiece for the device. By-pass accumulator bag 43 is secured to the third leg of the T-fitting by means of a length of soft plastic tubing 48 disposed with the normally deflated, initially sealed bag and engaged with the T-fitting by the procedure described above regarding bag 27 and tube 10. To this end, it is preferred that the T-fitting be made of glass or hard plastic and that the end of the fitting arm engaged with the by-pass bag be rough. Preferably the connection of the by-pass bag to the T-fitting is made at the place of manufacture of device 40.

The by-pass bag is inelastic and encloses a selected volume when fully inflated.

Alcohol trap 41 includes an elongated hollow tube 50 having opposite ends 51 defining external threads 52. Preferably the tube is made of glass. A known weight of granular material 53, having the characteristic that it absorbs or extracts alcohol vapor from gas passed through the tube, is disposed in tube 50 and is held in place between two wads 54 of glass wool or the like. Preferably the granular material is magnesium perchlorate. Normally, i.e., prior to its use and after use, the ends of tube 50 are sealed by internally threaded caps 55, shown in FIG. 8. The trap, however, is provided with two auxiliary caps 56, shown in FIG. 7, which are similar to caps 55 except that they define an axial bore 57 extending through a conically tapering projection 58 of the cap base.

Balloon 42 includes an outlet nipple 59 or the like secured circumferentially of a short length of soft plastic tubing 60.

Volumetric control bag 44 includes within it a short length of soft plastic tubing 61. Tubing 61 is used, in accord with the above-described procedure, to couple bag 44 to a short length of glass or hard plastic tubing 62, which tubing in turn carries a short length of soft plastic tubing 63. Tubing sections 61, 62 and 63 preferably are assembled at the place of manufacture of device 40.

Device 40 preferably is marketed in the assemblages described together with an indicator tube 10. If a police officer, for example, equipped with a device 40 suspects a driver of being under the influence of alcohol and wishes to confirm such state of the driver before making an arrest, the device may be used very easily to first obtain an accurate approximation of the driver's state of inebriation and to then obtain confirmatory evidence of such state if the first determination shows the driver to be sufficiently inebriated to warrant an arrest. In such event, the officer assembles the balloon by-pass bag assembly and the indicator tube and, after sealing off the balloon outlet, has the suspect inflate the balloon in a single exhalation until the balloon is of the selected size. The first breath expired by the suspect inflates the balloon only partially, but does not cause the balloon to expand; such breath will be from the suspect's mouth and will contain little alveolar air. The next quantity of breath passing through the mouthpiece will be from the suspect's mouth, trachea and bronchial tubes and will also contain little alveolar air; this breath passes into the by-pass bag. The capacity of the by-pass bag is sufficient to accumulate substantially all of the oral, tracheal and bronchial air in the exhalation not initially accumulated in the balloon, the initial amount of oral breath entering the balloon being small. The remaining breath exhaled by the suspect will be almost pure alveolar air, and this breath is that which causes the balloon to expand to the selected size. By proper selection of the size of the balloon and the by-pass bag, the expanded balloon will contain very close to 95% alveolar air. Once the balloon is inflated, the officer opens the outlet from the balloon so that alveolar breath passes from the balloon through the indicator tube. Because of the construction of the indicator tube, as described above, the breath flows through the granular reagent matrix at a predetermined rate. The officer merely permits the breath to flow through tube 10 for a predetermined period of time. If the color change of the reagent has progressed a certain distance along tube 10 away from the balloon, the officer is informed that the driver is sufficiently inebriated that an arrest is justified. The indication of inebriation provided by the indicator tube is highly accurate since substantially pure alveolar breath was used in generating the indication.

Of course, the above-described procedure can be carried out, if desired, with the volumetric control bag coupled to the indicator tube. In such a case, the officer need not time the period during which breath flows through the tube 10 from the balloon since the volumetric control bag automatically assures that a predetermined quantity of alveolar air passes through the tube.

Figure 7:
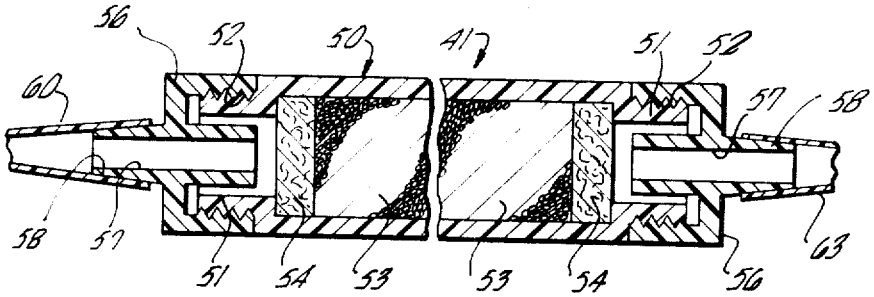
FIG. 7 is an enlarged cross-sectional elevation view of a part of the device shown in FIG. 6.
Figure 8:
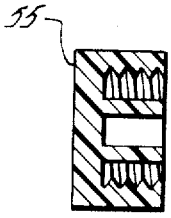
FIG. 8 is an enlarged cross-sectional elevation view of a storage cap for the container shown in FIG. 7.

If the officer makes an arrest, it is desirable that confirmatory evidence of the subject driver's state of inebriation be obtained; such confirmation is obtained by use of alcohol trap 41. As soon as the proper quantity of breath has passed from balloon 42 through indicator tube 10, the officer again seals off the balloon outlet and substitutes the alcohol trap and the volumetric control bag for the used indicator tube. If the volumetric control bag was used in conjunction with the indicator tube, the bag is fully deflated before connection to the alcohol trap as shown in FIG. 7. The balloon outlet is then unsealed and more breath is passed from the balloon to the volumetric control bag via the trap, the quantity of breath passing through the trap being regulated with precision by the volumetric control bag. The trap is then sealed by means of caps 55 and sent to a laboratory where the amount of alcohol vapor extracted by material 35 is determined with accuracy and used to accurately determine the weight percentage of alcohol in the person's blood.

In a presently preferred embodiment of device 40, by-pass bag 43 has a capacity of 1000 to 15000 cc. The initial capacity of balloon 42, before it begins to expand is 50 cc. The capacity of volumetric control bag is 575 cc., and the capacity of the balloon when expanded to the desired size is 750–1000 cc. The ratio of the blood alcohol content to alveolar air alcohol content is 1:2100. Theoretically, if the volume of alveolar air passed through trap 41 were 525 cc., multiplying the weight of alcohol extracted from alveolar breath by the trap by 4 would give the weight of alcohol present in one milliliter of blood of the person from whom the breath sample was obtained. The 575 cc. capacity of the volumetric bag corrects for the 50 cc. initial capacity of the balloon so that the weight of alcohol absorbed in the trap can be multiplied by 4 to give an accurate indication of blood alcohol content.

It will be apparent that if the full inflated capacity of balloon 42 is not sufficient to hold enough breath for passage through both tube 10 and trap 41, the balloon may be reinflated between uses of these elements of the device after first deflating bags 43 and 44.

Preferably tubing lengths, 30, 31, 37, 47, 48, 60, 61 and 63 are made from non-toxic plasticized polyvinyl chloride, such as formulation S–50–HL Tygon tubing made by United States Stoneware Co.

What is claimed is:

1. Apparatus for determining the amount of alcohol in a person's breath comprising a first inflatable and elastic container having an inlet adapted to be inflated to a selected size by a person blowing his breath thereinto and for exerting on breath therein a selected pressure when inflated and expanded to said selected size, a second elongate hollow container having a pair of opposite open ends housing therein a quantity of alcohol sensitive reagent which changes color progressively lengthwise therealong in response to alcohol vapor present in gas passed therethrough an amount proportional to the amount of alcohol vapor present in such gas, means securing said reagent in the second container so as to define a selected impedance to gas flowing therethrough, a third inflatable but inelastic container having an inlet and a maximum inflatable volume of predetermined capacity, and means for coupling the second container in a gas flow relation between the first and third container so that breath passes through the second container from the first container to the third container at a selected rate until the third container is filled.

2. Apparatus according to claim 1 wherein the first container has an outlet and the second container is coupled to said outlet.

3. Apparatus according to claim 1 wherein the first container requires the application of breath thereinto with substantial force to inflate the first container from a partially inflated but unexpanded state to said selected size, and includes a mouthpiece, a fourth initially deflated inflatable but inelastic container having a capacity sufficient in combination with the first container in the partially inflated state thereof to contain substantially all the non-alveolar breath of a person using the apparatus, and means coupling the mouthpiece, the first container inlet and the fourth container so that the first and fourth containers are communicated with the mouthpiece [to] *so* that the fourth container accumulates that non-alveolar breath not required to inflate the first container to its partially inflated state, and the third container has a capacity a selected amount greater than the capacity of the first container in said partially inflated state thereof.

4. Apparatus according to claim 3 including a fifth container interchangeable with the second container between the first and third containers, the fifth container containing a quantity of a second granular material which extracts and retains alcohol vapor from breath passing through the fifth container.

5. Apparatus according to claim 1 wherein the end of the second container toward the third container has rough edges around the opening into the second container at said end, the third container is made of thin plastic film, and the means coupling the second and third containers comprises a length of soft plastic tubing disposed in the third container and snugly engaged around the outer cricumference of said end of the second container.

6. A method of coupling a tubular element in sealed fluid flow communication with a bag made of polyethylene film and the like comprising the steps of (a) providing a tubular element made of substantially hard material having an open end with the boundary of said open end being rough, (b) providing a sealed deflated bag made of polyethylene film and the like, the bag having therein a short length of soft plastic tubing having an inner diameter less than but approximating the outer diameter of the tubular element adjacent said open end thereof, (c) placing an end of said tubing against an inner surface of said film, (d) rendering taut said film over said end of the tubing, (e) placing the rough boundary of the open end of the tubular element against the exterior surface of the film in substantially coaxial alignment with said tubing, and (f) forcing the tubular element into the tubing sufficiently far that the film lies circumferentially of the tubular element between the exterior thereof and the tubing and is held snugly by the tubing and that the rough end of the tubular element ruptures the film so that the interiors of the bag and the tubular element are communicated.

7. The method according to claim 6 wherein the tubular element is made of glass and the like, and the tubing is made of plasticized polyvinyl chloride.

*8. Apparatus for determing the amount of alcohol in a person's breath comprising a first inflatable and elastic container having an inlet adapted to be inflated to a selected size by a person blowing his breath thereinto and for exerting on breath therein a selected pressure when inflated and expanded to said selected size, a second elongate hollow container having a pair of opposite open ends housing therein a quantity of alcohol vapor extracting and retaining material, means securing said material in the second container so as to define a selected impedance to gas flowing therethrough, a third inflatable but inelastic container having an inlet and a maximum inflatable volume of predetermined capacity, and means for coupling the second container in gas flow relation between the first and third container so that breath passes through the second container from the first container to the third container at a selected rate until the third container is filled.*

*9. Apparatus according to claim 8 wherein the first container has an outlet and the second container is coupled to said outlet.*

*10. Apparatus according to claim 8 wherein the first container requires the application of breath thereinto with substantial force to inflate the first container from a partially inflated but unexpanded state to said selected size, and includes a mouthpiece, a fourth initially deflated inflatable but inelastic container having a capacity sufficient in combination with the first container in the partially inflated state thereof to contain substantially all the non-alveolar breath of a person using the apparatus, and means coupling the mouthpiece, the first container inlet and the fourth container so that the first and fourth containers are communicated with the mouthpiece so that the fourth container accumulates that non-alveolar breath not required to inflate the first container to its partially inflated state, and the third container has a capacity a selected amount greater than the capacity of the first container in said partially inflated state thereof.*

*11. Apparatus for sampling the amount of alcohol in a person's breath comprising:*

*a first inflatable and elastic container having an inlet adapted to be inflated by a person blowing his breath thereinto and for exerting on breath therein a pressure when inflated and expanded;*

*a second hollow container having a pair of opposite open ends and containing a quantity of a solid material which extracts and retains alcohol vapor from breath passing through the second container;*

*means for securing the solid material in the second container;*

*a third inflatable but inelastic container having an inlet and a maximum inflatable volume of predetermined capacity; and*

*means for coupling the second container in gas flow relation between the first and thrid container so that breath passes through the second container from the first container to the third container until the third container is filled.*

*12. Apparatus according to claim 11 wherein the first container has an outlet and the second container is coupled to said outlet.*

*13. Apparatus according to claim 11 wherein the first container requires the application of breath thereinto with substantial force to inflate the first container from a partially inflated but unexpanded state to an expanded state; and includes:*

*a mouthpiece;*

*a fourth initially deflated inflatable but inelastic container; and*

*means coupling the mouthpiece, the first container inlet and the fourth container so that the first and fourth containers and the mouthpiece are in fluid communication; and wherein*

*the third container has a capacity a selected amount greater than the capacity of the first container in the partially inflated state thereof.*

References Cited

The following references, cited by the Examiner, are of record in the patented file of this patent or the original patent.

UNITED STATES PATENTS

| | | | |
|---|---|---|---|
| 2,867,511 | 1/1959 | Harger | 23—254 |
| 3,223,488 | 12/1965 | Luckey | 23—254 |
| 2,591,691 | 4/1952 | Forrester | 23—254X |
| 3,009,786 | 11/1961 | Luckey | 23—254 |

MORRIS O. WOLK, Primary Examiner

R.M. REESE, Assistant Examiner

U.S. Cl. X.R.

23—232